Patented Mar. 19, 1940

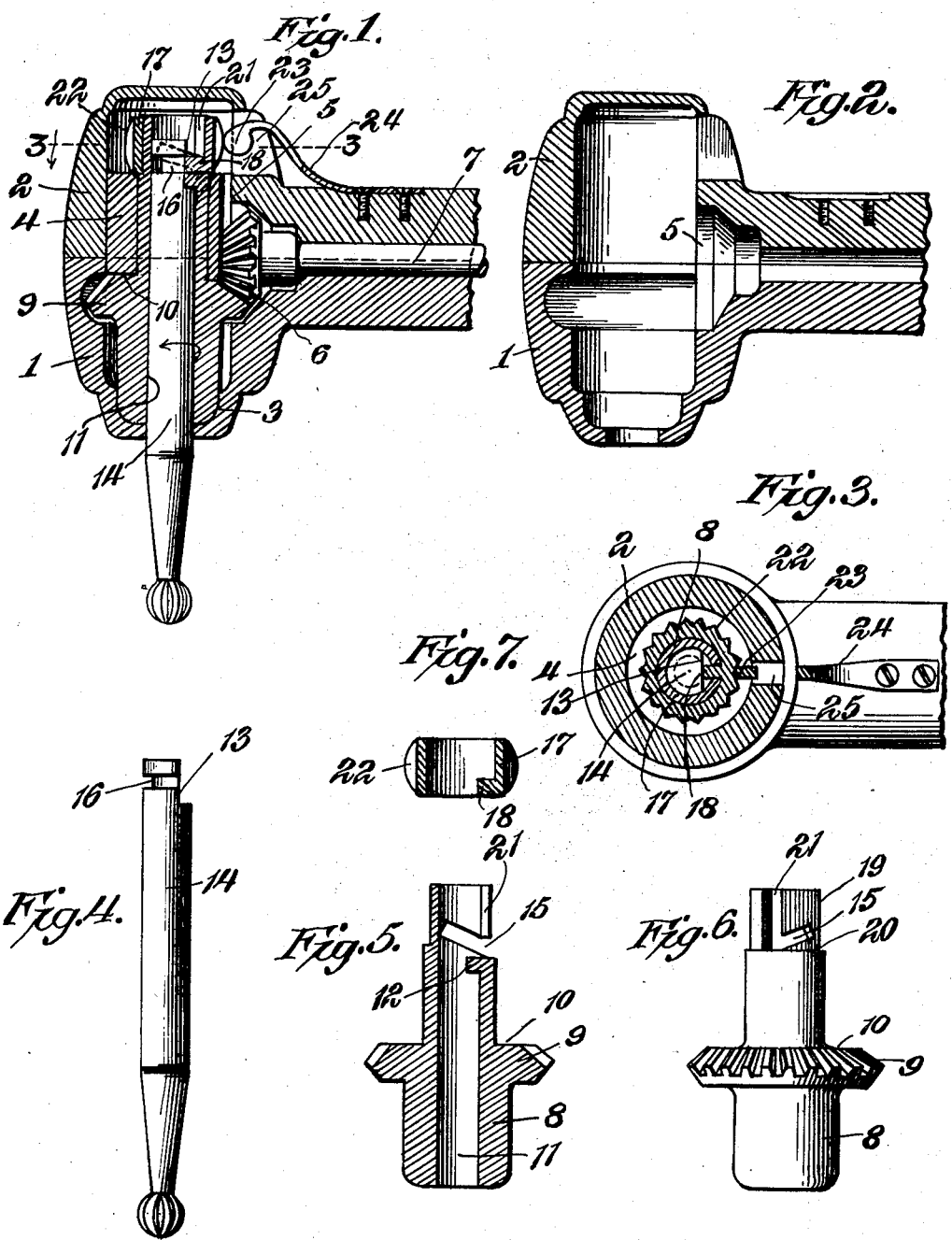

2,194,187

UNITED STATES PATENT OFFICE 2,194,187

ANGLE DENTAL HANDPIECE

Perry R. Skinner, Amsterdam, N. Y.

Application March 14, 1938, Serial No. 195,916

3 Claims. (Cl. 279—9)

This invention relates to angle dental handpieces. In these instruments the principal requirement is that the shank of a burr or other tool be received by and retained in a holding member in a manner to prevent the slightest independent movement of the shank after being secured in place and rotated for use. Obviously, any looseness in the holding means of a boring or other tool for dental work, where extreme accuracy of operation is necessary, results in the accomplishment of unsatisfactory work. In the holding and securing means commonly used there are an unnecessary number of parts to which movement is imparted in driving and securing a tool, and any movement between these parts is translated into an insecure holding of the tool, with resultant wabbling or displacement of the latter. Commonly in the usual constructions the greatest wear takes place because of the fact that a latch or its equivalent, secured to a non-rotating part, is brought to engage the shank of a tool which is rotated in use. In these constructions it is impossible to obtain a rigid locking of the tool in place even when the parts are accurately proportioned and unworn. This is because that in the standard forms the latch is introduced into a circumferential groove in the shank of a tool to be rotated, to prevent withdrawal of the tool, and there must be sufficient difference between the widths of the latch and groove to permit free movements of the latch into and out of the groove to make possible the necessary rapid and easy introduction and locking and the withdrawal of a tool. Thus, in the use of the construction when new and in good condition there is objectionable independent movement of the tool, and the permitted movement increases as wear takes place in the latch and in the walls of the groove in the shank of the tool.

One purpose which I have in view is to provide in instruments of the kind referred to means whereby the shank of a tool may be secured in position for use and readily be attached to a rotative part, in a manner to prevent any independent movement of the tool. Another purpose is to provide an attaching means of the kind specified, which shall be so formed that any wear caused by repeated introductions and withdrawals of tools to and from the holding means, and operations of tool-attaching means, shall automatically be compensated for. Also, I have in view to provide tool-holding, driving and securing means in dental instruments, composed of a reduced number of parts, whereby a rigid structure occupying only the usual limited space, may serve materially to lessen the common objectionable independent movements of such parts, and consequent wear resulting in insecure holding of tools.

The invention resides in a construction having the novel forms and arrangements of component parts, substantially as hereinafter described and claimed.

In the present illustration of the invention I have shown an effective structure by which the specified purposes are accomplished. It is to be understood that changes in the forms and arrangement of the parts may be made without departing from the spirit of the invention.

In the accompanying drawing:

Figure 1 is a central vertical sectional view of the head of an angle dental handpiece, having the improved tool-receiving and retaining means arranged therein, a tool being shown in position to be attached for use.

Figure 2 is a sectional view of the head of the handpiece.

Figure 3 is a transverse sectional view, taken on the line 3—3 of Figure 1.

Figure 4 is a side view of a tool having the standard form of shank.

Figure 5 is a longitudinal sectional view of the member by which the shank of a tool is received and held during operation.

Figure 6 is a side view of the tool-receiving member.

Figure 7 is a vertical sectional view of the locking ring by which a tool is secured in the tool-receiving member.

In this drawing the hollow head of the handpiece into which the shank of a tool is introduced and secured is shown as composed of two separable sections 1 and 2, to permit ready introduction and removal of the operative parts. The lower part 1 of the head has formed in it a bearing 3 for the end of a tool-receiving member, and arranged mainly in the upper portion is a tubular removable bearing 4 of a size to receive the body of the member. The bearing 4 is recessed at one side, at 5, to receive a bevel gear 6 through which motion is imparted to a tool-receiving member. Secured to the gear 6 is a shaft 7 to be rotated in the usual manner.

The main portion of the means for holding, rotating and securing a tool in place in the head of the instrument, is composed of a member 8. This member is cylindrical in general form and has formed with it a circumferential bevel gear 9 with which meshes the gear 6. The lower end of the member 8 is shaped to conform to the bearing 3 in the interior of the head, and the upper face of the gear 9 is plane, forming a surface 10 which bears upon the lower end of the bearing 4.

In assembling the parts, the upper portion of the tool-receiving member 8 is introduced into the bearing 4 to bring the bearing to bear upon the surface 10 of the member. The member 8 is then placed in position in the section 1 of the head of the instrument, the gear 6 is placed in position to engage the bevel gear 6 of the member 8, the section 2 of the head is placed to receive the upper end of the member, and finally the sections are secured in place. When the parts are arranged as described the inner end of the gear 6 bears against the wall of the recess in the bearing, and, therefore, rotation of the latter is prevented in the operation of the tool. The construction described permits easy and rapid substitution of a new bearing for a worn one and thus permits of the use of the other parts of the instrument on which little wear is imposed for an indefinite time.

For the purpose of making use of the fewest possible number of parts necessary for receiving, rotating and securing a tool in operative position, the member 8, first, has a central longitudinal opening 11 which corresponds in diameter to that of the standard tool, and thus forms a tool-receiving member. The member has extending into its interior a lug or projection 12 of a form to be received by the recess 13 in side of the shank 14 of a tool at the end of the shank, to cause the tool to rotate with the member, and it has a slot 15 in its wall to receive a projection of a locking member, such projection being introduced into and retained in the circumferential groove 16 located near the end of the shank of the tool to secure the tool during use.

The means employed in the present form of the invention for securing a tool from withdrawal from the member 8 consists of a ring or collar 17 having an inwardly extending lug 18. This ring or collar is of a size to be received by the upper reduced end 19 of the member 8, and when in place rests upon a seat 20 at the base of the reduced end. Extending from the outer end of the portion 19 to a point intersecting the slot 15, is a slot 21 of a size to permit the passage through it of the projection 18 of the ring or collar when the latter is being placed in position to bear upon its seat 20.

The slot 21 in the member 8 intersects the slot 15 in such member at a position in line with the lug or projection 12, and from the point of intersection the slot 15 extends around approximately two-thirds of the diameter of the member and at an angle upwardly.

The ring or collar 17 has formed on its outer face a series of serrations or teeth 22, and arranged on the casing of the tool is a spring-held brake or stop 23 which is adapted to be brought to engage the teeth or projections to prevent the rotation of the ring or collar with the reduced portion of the member 8 with which the ring or collar is normally rotated. The brake or stop 23 is herein shown as formed with a resilient arm 24 attached to the casing of the instrument which normally maintains the brake out of contact with the teeth of the ring or collar. The casing of the head is provided with a slot 25 through which the arm 24 extends, the slot being of a size corresponding to that of the arm, so that possibility of the entrance of moisture or fine particles to the interior of the head is prevented.

In the use of the tool-receiving and locking means the shank of a tool is introduced into the member 8 and brought to a position to cause the lug or projection 12 to enter the recess 13 in the shank, thus insuring the rotation of the parts in unison. When the shank is positioned as described, its circumferential groove 16 is in line with the end of the slot 15 which intersects the lower end of the slot 21. The initial position of the ring or collar is that in which its projection 18 extends through the member 8 at the point where the two slots intersect and, therefore, in line with the groove 16 of the shank and into the recess 13 in the shank. When the parts are in the positions described, the brake is brought to engage the locking ring or collar, and the member 8 is given a partial rotation in the direction indicated by the arrows, which is the direction in which the tool is rotated during use. As the member 8 and the tool are rotated, the projection 18 is caused to enter the slot 15 in the member 8 and also to enter the groove 16 in the shank of the tool, thus preventing the withdrawal of the latter. Because of the inclination of the slot 15 it will be apparent that as the shank of the tool is prevented from longitudinal movement by contact with the lug 12, the passage of the projection 18 in the slot 15 will cause a pressure on the upper wall of the groove 16 and thus exert a force to lock the shank in place in a manner to prevent even the slightest movement. The rotation of the tool in the direction indicated, at all times during use, tends to force the locking projection upwardly in the inclined slot 15, insuring the firm holding of a tool during use.

The removal of a tool may quickly be accomplished by applying the brake or stop to the locking ring or collar and by giving a sufficient rotation to the member 8 to free the locking projection from the slot 15 and from the groove 16 in the shank of the tool, and cause it to abut against the wall of the slot 21. In this position of the parts the locking projection extends into the recess 13 in the shank, leaving the tool free to be withdrawn.

The described construction provides an improved receiving, driving, locking, and releasing means for a dental tool, composed of only two parts. As these parts by their forms prevent, during the holding and operation of a tool, any independent movements, wear on them is reduced to a minimum. Besides, any wear, however slight, is automatically compensated for by reason of the cooperation of the locking projection and the inclined surface upon which the projection bears and upon which it is maintained thus insuring the requisite rigid holding of a tool during use.

I claim:

1. An instrument of the kind described comprising a rotatable tool-receiving member having an elongated inclined opening in its side, and a locking member carried by the tool-receiving member, capable of limited rotation thereon, and having a projection adapted to extend through the inclined opening and to enter a groove in a tool to retain the latter, the parts being so disposed that in the rotation of the tool-receiving member the projection is forced against the wall of the groove in the tool to secure the tool in locked position.

2. An instrument of the kind described comprising a tubular rotatable tool-receiving member having a longitudinal slot extending from its end and a circumferential opening extending obliquely from the slot, and a locking member consisting of a ring or collar encircling the tool-receiving member and having a projection adapted to be introduced through the slot and to be moved into or out of the oblique opening, the projection being of a length to enter a groove in a tool carried in the tool-receiving member, to retain the tool, or to be removed from the groove to release the tool.

3. An instrument of the kind described comprising a tubular rotatable tool-receiving member having a longitudinal slot extending from its end and a circumferential opening extending obliquely from the slot, a locking member consisting of a ring or collar encircling the tool-receiving member, and having a projection adapted to be introduced through the slot and to be moved into or out of the oblique opening, the projection being of a length to enter a groove in a tool carried in the tool-receiving member, to retain the tool, or to be removed from the groove to release the tool, and a brake or stop movable to engage the ring or collar and check its rotating with the tool-receiving member.

PERRY R. SKINNER.